(12) United States Patent
Panguluri et al.

(10) Patent No.: US 8,595,516 B2
(45) Date of Patent: Nov. 26, 2013

(54) SYSTEM AND METHOD FOR GLOBAL POWER MANAGEMENT IN A POWER OVER ETHERNET CHASSIS

(75) Inventors: Sesha Thalpasai Panguluri, Santa Clara, CA (US); Asif Hussain, Tustin, CA (US); Martin McNarney, Morgan Hill, CA (US); Hemanth Nekkileru, San Jose, CA (US); Palathingal Frank, Santa Clara, CA (US)

(73) Assignee: Broadcom Corporation, Irvine, CA (US)

( * ) Notice: Subject to any disclaimer, the term of this patent is extended or adjusted under 35 U.S.C. 154(b) by 750 days.

(21) Appl. No.: 12/348,269

(22) Filed: Jan. 2, 2009
(Under 37 CFR 1.47)

(65) Prior Publication Data

US 2010/0106985 A1    Apr. 29, 2010

Related U.S. Application Data

(60) Provisional application No. 61/018,689, filed on Jan. 3, 2008.

(51) Int. Cl.
| | |
|---|---|
| *G06F 1/00* | (2006.01) |
| *G06F 1/26* | (2006.01) |
| *G06F 11/30* | (2006.01) |

(52) U.S. Cl.
USPC ........... 713/300; 713/320; 713/324; 713/340; 718/103

(58) Field of Classification Search
USPC ................... 713/300, 320, 324, 340; 718/103
See application file for complete search history.

(56) References Cited

U.S. PATENT DOCUMENTS

| | | | | |
|---|---|---|---|---|
| 5,379,428 | A * | 1/1995 | Belo | 718/103 |
| 6,968,466 | B2 * | 11/2005 | Bolian et al. | 713/300 |
| 7,203,849 | B2 * | 4/2007 | Dove | 713/300 |
| 7,337,336 | B2 * | 2/2008 | Ferentz et al. | 713/300 |
| 7,340,325 | B2 * | 3/2008 | Sousa et al. | 700/295 |
| 7,571,331 | B2 * | 8/2009 | Ohana et al. | 713/300 |
| 2004/0230846 | A1 * | 11/2004 | Mancey et al. | 713/300 |
| 2005/0243861 | A1 * | 11/2005 | Elkayam et al. | 370/466 |
| 2005/0272402 | A1 * | 12/2005 | Ferentz et al. | 455/402 |
| 2006/0053324 | A1 * | 3/2006 | Giat et al. | 713/300 |
| 2006/0212724 | A1 * | 9/2006 | Dwelley et al. | 713/300 |
| 2006/0259792 | A1 * | 11/2006 | Dove | 713/300 |
| 2007/0135086 | A1 * | 6/2007 | Stanford | 455/402 |
| 2007/0136614 | A1 * | 6/2007 | Heath et al. | 713/300 |
| 2007/0277049 | A1 * | 11/2007 | Hansalia | 713/321 |
| 2008/0004058 | A1 * | 1/2008 | Jeong et al. | 455/517 |
| 2008/0005600 | A1 * | 1/2008 | Diab et al. | 713/300 |
| 2008/0114997 | A1 * | 5/2008 | Chin | 713/321 |

* cited by examiner

*Primary Examiner* — Mark Connolly
(74) *Attorney, Agent, or Firm* — Duane S. Kobayashi

(57) ABSTRACT

A system and method for global power management in a power over Ethernet (PoE) chassis. Power supply status signals indicative of an operating condition of a plurality of power supplies are provided to a plurality of power sourcing equipment (PSE) controller chips in a plurality of blades of a chassis system. Pre-configured combination logic within each of the PSE controller chips converts an indicated operational state of the plurality of power supplies into a powering decision for each of the ports served by the PSE controller chip. Global power management is also effected through the use of scaling factors for the various blades to ensure that the lowest priority powered port (LPPP) in a first blade does not have a lower priority than the highest priority non-powered port (HPNPP) in a second blade.

17 Claims, 5 Drawing Sheets

SYSTEM AND METHOD FOR GLOBAL POWER MANAGEMENT IN A POWER OVER ETHERNET CHASSIS

This application claims priority to provisional application No. 61/018,689, filed Jan. 3, 2008, which is incorporated by reference herein, in its entirety, for all purposes.

BACKGROUND

1. Field of the Invention

The present invention relates generally to Power over Ethernet (PoE) and, more particularly, to a system and method for global power management in a PoE chassis.

2. Introduction

The IEEE 802.3af and 802.3at PoE specifications provide a framework for delivery of power from power sourcing equipment (PSE) to a powered device (PD) over Ethernet cabling. Various types of PDs exist, including voice over IP (VoIP) phones, wireless LAN access points, network cameras, computing devices, etc.

In the PoE process, a valid device detection is first performed. This detection process identifies whether or not it is connected to a valid device to ensure that power is not applied to non-PoE capable devices. After a valid PD is discovered, the PSE can optionally perform a power classification. In 802.3af, the power classification process can be used to classify a PD into various pre-defined power levels (i.e., 4.0 W, 7.0 W, and 15.4 W). In more advanced power classification schemes, a dynamic power management process can be used to generate a power request and priority for a PD based on current or anticipated power needs. As the total PSE power budget is typically limited as compared to the total power demand of the set of PDs, the dynamic power management process would consider the competing power needs of the various PDs.

The goal of the PSE management task is to provide stable output power to the various PDs. There are different PoE power supplies schemes used in the industry. Many stackable switches use a 1+1 redundant system for PoE using O ring diodes in which case available power is only limited to one power supply. In chassis based switches, on the other hand, N+1 redundancy enables current sharing in which case available power is N and one power supply is used for back up purpose. This additional power supply comes at significant cost. What is needed therefore is a mechanism that enables protection from power supply failures without incurring the cost of redundant power supplies.

SUMMARY

A system and/or method for global power management in a PoE chassis, substantially as shown in and/or described in connection with at least one of the figures, as set forth more completely in the claims.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered limiting of its scope, the invention will be described and explained with additional specificity and detail through the use of the accompanying drawings in which.

DETAILED DESCRIPTION

Various embodiments of the invention are discussed in detail below. While specific implementations are discussed, it should be understood that this is done for illustration purposes only. A person skilled in the relevant art will recognize that other components and configurations may be used without parting from the spirit and scope of the invention.

Figure 1:
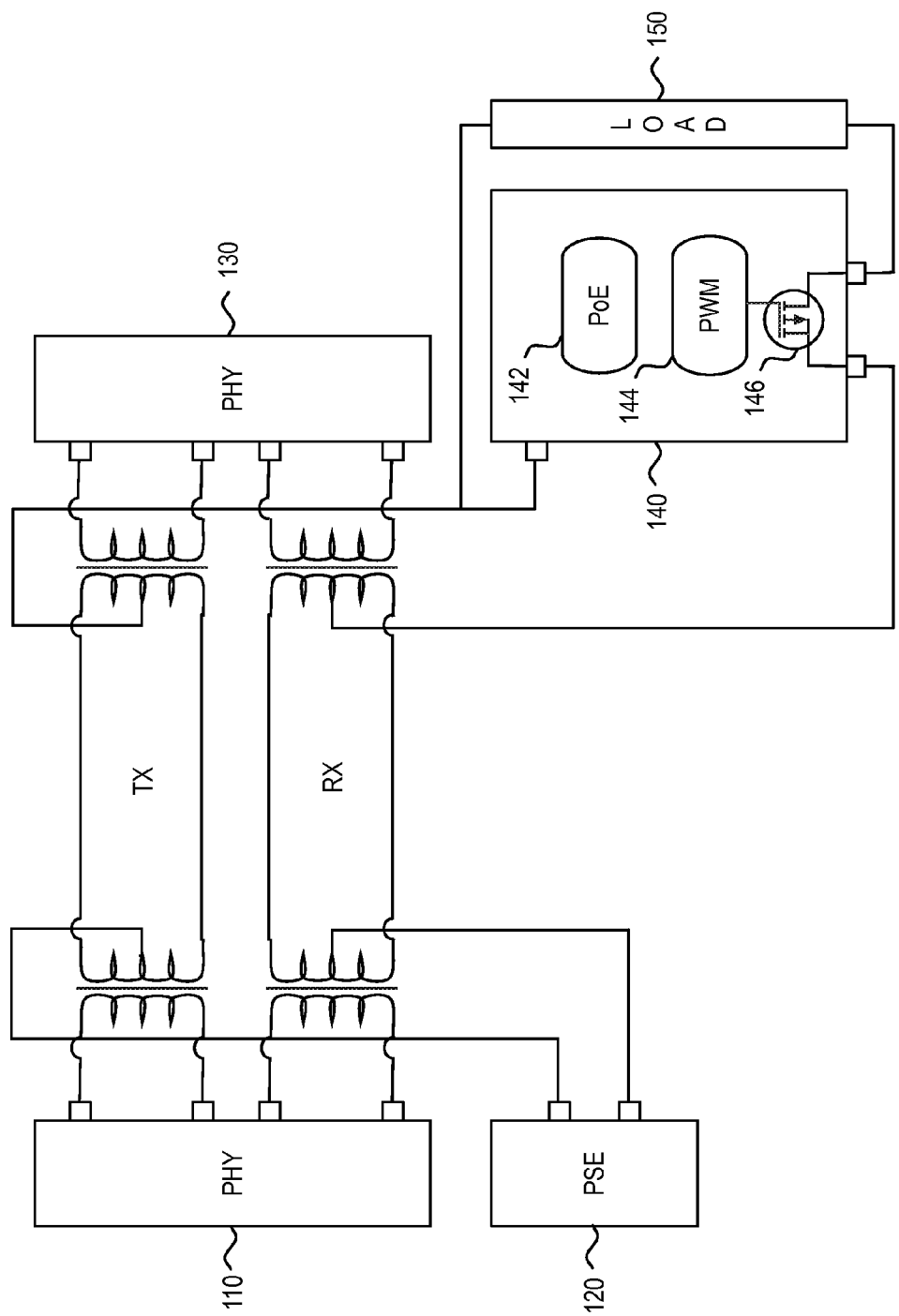
FIG. 1 illustrates an embodiment of a PoE system.

FIG. 1 illustrates an embodiment of a power over Ethernet (PoE) system. As illustrated, the PoE system includes power sourcing equipment (PSE) 120 that transmits power to powered device (PD) 140. Power delivered by the PSE to the PD is provided through the application of a voltage across the center taps of transformers that are coupled to a transmit (TX) pair and a receive (RX) pair of wires carried within an Ethernet cable. In general, the TX/RX pair can be found in, but not limited to structured cabling. The two TX and RX pairs enable data communication between Ethernet PHYs 110 and 130 in accordance with 10BASE-T, 100BASE-TX, 1000BASE-T, 10 GBASE-T and/or any other layer 2 PHY technology.

As is further illustrated in FIG. 1, PD 140 includes PoE module 142. PoE module 142 includes the electronics that would enable PD 140 to communicate with PSE 120 in accordance with a PoE standard such as IEEE 802.3af, 802.3at, legacy PoE transmission, or any other type of PoE transmission. PD 140 also includes pulse width modulation (PWM) DC:DC controller 144 that controls power FET 146, which in turn provides constant power to load 150.

In the example of the IEEE 802.3af standard, PSE 120 can deliver up to 15.4 W of power to a plurality of PDs (only one PD is shown in FIG. 1 for simplicity). In the IEEE 802.at draft specification, on the other hand, a PSE may be able to deliver up to 30 W of power to a PD over 2-pairs. Other proprietary solutions can potentially deliver even higher levels of power to a PD. In general, high power solutions are often limited by the limitations of the cabling.

Figure 2:
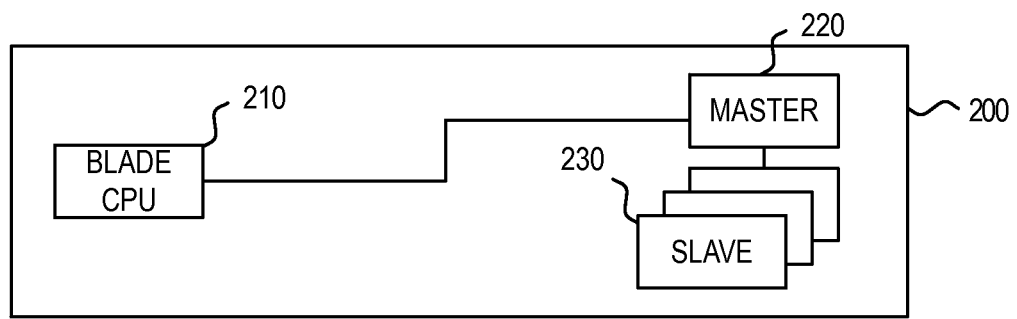
FIG. 2 illustrates an embodiment of a blade in a chassis based system.

In a chassis based system, multiple blades can be housed. In this framework, a single blade can support, for example, 48 ports using 12 quad controller PSEs. FIG. 2 illustrates an embodiment of a blade in a chassis based system. As illustrated, blade 200 includes local CPU 210 along with a plurality of PSE controllers that each support a set of PDs. In one embodiment, one of the PSE controllers is designated as master 220 and the remaining PSE controllers are designated as slaves 230.

In one conventional design, each blade is powered using a single power supply. An N-blade system would therefore be powered using N power supplies that are each dedicated to respective blades. In one power supply protection scheme, an N+1 redundant system is used wherein a single redundant power supply can be substituted for a blade's failed power supply.

In accordance with the present invention, a global power management scheme is provided that is not reliant on the one-to-one correspondence of power supplies and blades in a chassis system. In one embodiment, multiple power supplies (e.g., PS0, PS1, PS2, . . . PSN) can be used to provide, in a collective manner, power to the entire chassis system. A failure in a single power supply would then be reflected as a reduction in the total amount of power available to the chassis system. A response to such a failure could then be managed across the entire chassis. For example, a reduction in the total amount of power available to the chassis could lead to the deactivation of certain lower priority ports in one or more blades in the chassis system. Significantly, responses to failures in one or more supplies can be managed globally across the entire chassis, instead of a response being focused on a single blade in the chassis.

Figure 3:
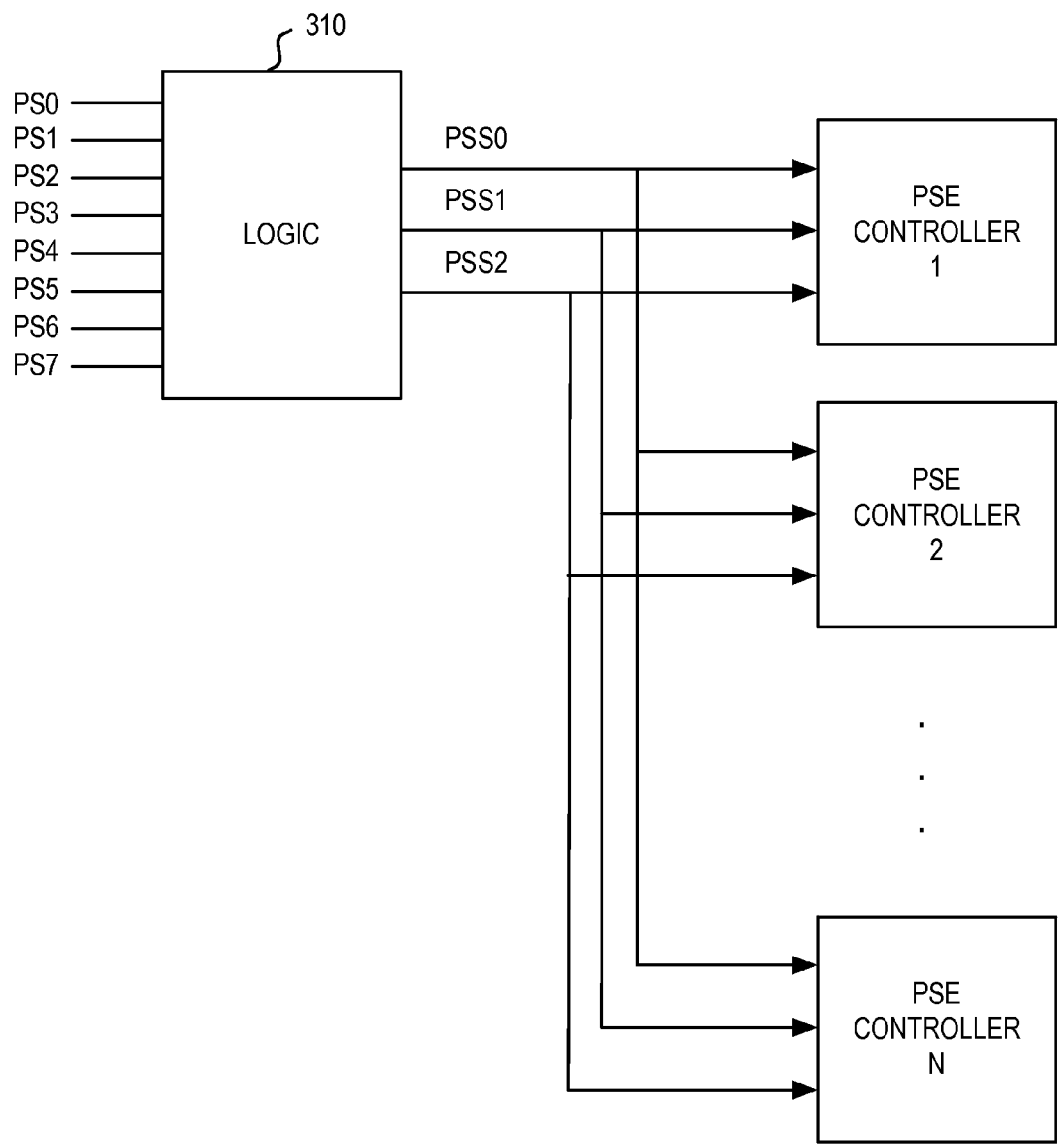
FIG. 3 illustrates an embodiment of a mechanism that generates power supply status signals.

In responding to the failure of one or more power supplies, each blade is provided with status signals relating to the bank of power supplies that is coupled to the chassis system. FIG. 3 illustrates an embodiment of a mechanism for generating the power supply status signals. As illustrated, the PoE system includes PSE controllers 1-N. These PSE controllers can be resident on a single blade, or on multiple blades. In the illustrated example, PSE controllers 1-N receives a 3-bit power supply status signal (PSS0, PSS1, PSS2) that is representative of the status of a bank of up to eight different power supplies (PS0-PS7).

In the illustrated example, the status of the eight power supplies PS0-PS7 are provided as inputs to logic block 310. In various embodiments, logic block 310 can be embodied as a complex programmable logic device (CPLD), field programmable gate array (FPGA), or the like. In general, logic block 310 is operable to convert the status indications of power supplies PS0-PS7 into power supply status signals PSS0, PSS1, PSS2. Power supply status signals PSS0, PSS1, PSS2 would then be provided as inputs to each of PSE controllers 1-N. In one example, logic block 310 would be designed to indicate how many of the eight power supplies PS0-PS7 are available through the logic level of the three power supply status signals PSS0, PSS1, PSS2. For example, power supply status signals PSS0, PSS1, PSS2 can have values 0, 1, 1, respectively, indicating that three out of eight power supplies are operational. As would be appreciated, logic block 310 can be used to generate power supply status signals that are reflective of any particular operating state of a set of power supplies.

Table 1 illustrates an example of different power combinations of power supplies that can be used to generate the power supply status signals. Here, the various power combinations represent a particular level of available power to the chassis.

TABLE 1

| Power Combination | PSS0 | PSS1 | PSS2 | Power Available |
|---|---|---|---|---|
| 1 | 0 | 0 | 0 | A |
| 2 | 0 | 0 | 1 | B |
| 3 | 0 | 1 | 0 | C |
| 4 | 0 | 1 | 1 | D |
| 5 | 1 | 0 | 0 | E |
| 6 | 1 | 0 | 1 | F |
| 7 | 1 | 1 | 0 | G |
| 8 | 1 | 1 | 1 | H |

Figure 4:
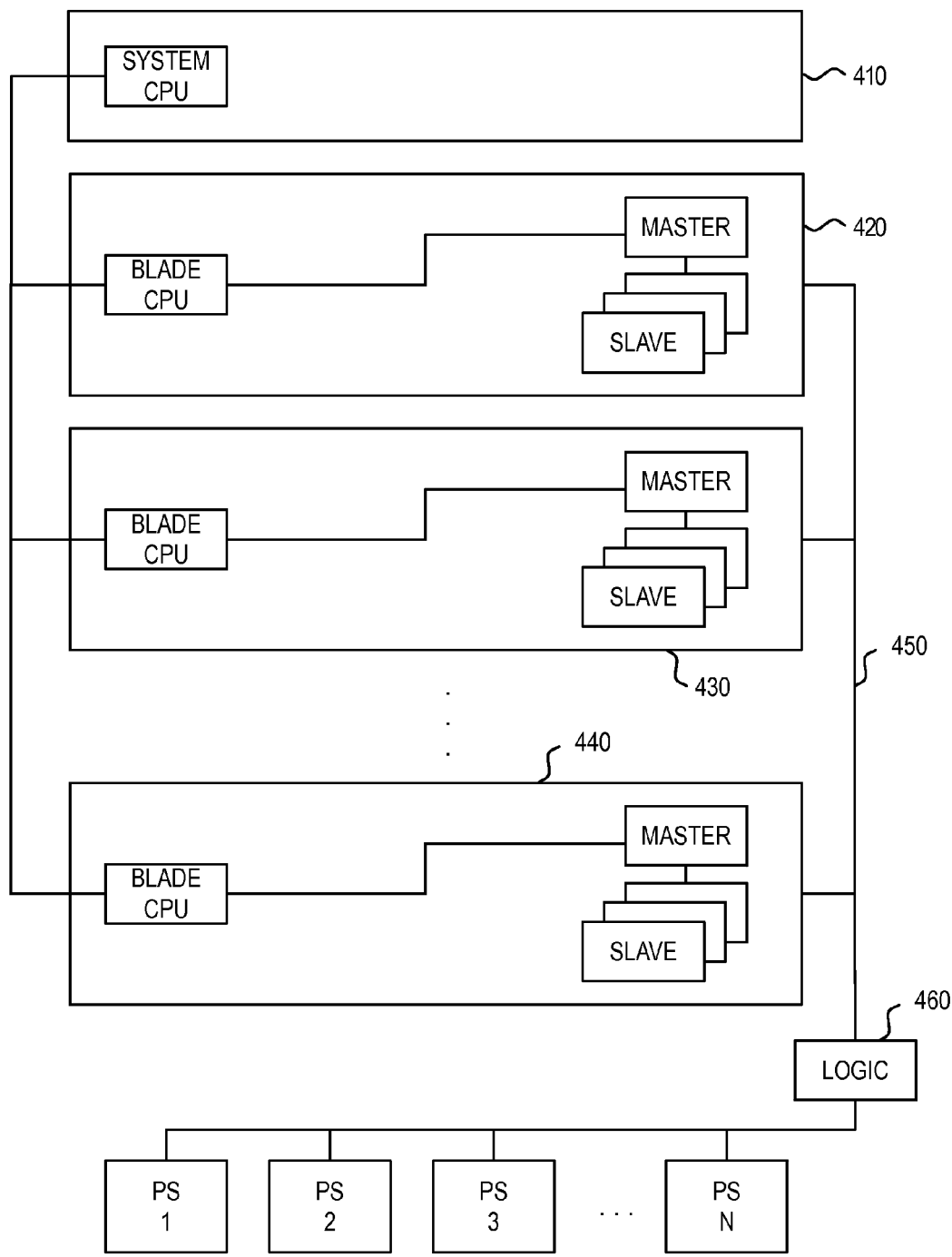
FIG. 4 illustrates an embodiment of a chassis system that receives power supply status signals.

FIG. 4 illustrates an application of such a logic block to a chassis system. In this example, the chassis system includes management blade 410 that contains a system CPU, and PoE blades 420, 430, 440 that each contain a local CPU and master/slave PSE controllers. In one example, blade 320 can have a master quad controller PSE and 11 slave quad controller PSEs that support a total of 48 ports. In accordance with the present invention, each master/slave PSE controller would receive power supply status signals via bus 450. These power supply status signals would be generated by logic block 460 in response to the particular power combination of a set of power supplies PS1-PSN.

As noted, the power supply status signals PSS0, PSS1, PSS2 are provided to each master/slave PSE controller in the various blades 420, 430, 440. Each of these PSS0, PSS1, PSS2 combinations trigger pre-configured registers in each PSE controller that take into account port priorities. In general, higher priority ports are powered up first to use up an available power budget and lower priority ports are disconnected first to accommodate an oversubscribed power budget. In the configuration process, bit masks for each PSS0, PSS1, PSS2 combination are created by identifying the ports that should be powered for a given power PSE budget as dictated by the available power supplies.

In one embodiment, each port on each chip contains a table of each of the different power combinations. Table 2 illustrates an example of a table that can be stored for a particular port.

TABLE 2

| | Power Combination | | | | | | | |
|---|---|---|---|---|---|---|---|---|
| | 1 | 2 | 3 | 4 | 5 | 6 | 7 | 8 |
| Port Bit | 0 | 1 | 1 | 1 | 0 | 0 | 0 | 0 |

With this table, a PSE can activate or deactivate a port based on the power combination that is signaled by the power supply status signals generated by logic block 460. For example, if the power supply status signals indicate power combination four, the port would be activated. If one or more power supply failures produce power supply status signals that indicate a change to power combination six, then that port would be deactivated.

As one or more power supplies transition between available and unavailable states, the power combinations indicated by the power supply status signals would continually adjust the status of the various ports in the chassis. The changes in combination based on the change in status of the power supplies can lead to rapid connection/disconnection of ports for each of the PSEs. This rapid connection/disconnection of ports is facilitated by the receipt of power supply status signals directly by each PSE. In general, a change in status can be detected in less than one microsecond, thereby ensuring that actual power consumption is less than the power available from the power supplies. This power management across the various PSEs in the various blades of the chassis would prevent the system from crashing due to oversubscription of power.

As noted, on each chip in the system, each of the ports contains a bit associated with each of the different power combinations. When the power combination changes, then action is taken in the chip on each of the four ports. The action is to leave the port in its current state, or transition the port into an ON/OFF position.

In one embodiment, at system start up, power supply related information as to the total available power and the total power budget, etc. is used to configure each port as to the ports to be turned on/off for each of the power combinations.

The generated tables would then be established to govern system response in the availability of one or more power supplies.

In one embodiment, global power management is also provided through the implementation of scaling factors amongst the different blades. As illustrated in Table 3, each of the different power combinations 1-8 would yield a total power S-Z, respectively. In allocating the total amount of power across the various blades, scaling factors "a"-"g" can also be used in adjusting the amount of power that is made available to each blade. For example, if no scaling factor is used, then each blade would receive the same amount of power. If a=1.5 and b=0.5, and c, d, e, f, and g=1, then blade 1 would receive 50% more power and blade 2 would receive 50% less power than the other blades. The total amount of power even with a=1.5 and b=0.5 would remain the same.

TABLE 3

| Power Combination | 1 | 2 | 3 | 4 | 5 | 6 | 7 | Total Power |
|---|---|---|---|---|---|---|---|---|
| 1 | a * S/7 | b * S/7 | c * S/7 | d * S/7 | e * S/7 | f * S/7 | g * S/7 | S |
| 2 | a * T/7 | b * T/7 | c * T/7 | d * T/7 | e * T/7 | f * T/7 | g * T/7 | T |
| 3 | a * U/7 | b * U/7 | c * S/7 | d * U/7 | e * U/7 | f * U/7 | g * U/7 | U |
| 4 | a * V/7 | b * V/7 | c * V/7 | d * V/7 | e * V/7 | f * V/7 | g * V/7 | V |
| 5 | a * W/7 | b * W7 | c * W/7 | d * W/7 | e * W/7 | f * W/7 | g * W/7 | W |
| 6 | a * X/7 | b * X/7 | c * X/7 | d * X/7 | e * X/7 | f * X/7 | g * X/7 | X |
| 7 | a * Y/7 | b * Y/7 | c * Y/7 | d * Y/7 | e * Y/7 | f * Y/7 | g * Y/7 | Y |
| 8 | a * Z/7 | b * Z/7 | c * Z/7 | d * Z/7 | e * Z/7 | f * Z/7 | g * Z/7 | Z |

A general goal of global power management is to make sure that power is effectively allocated across the various ports in the entire chassis. As part of this process, it is important that the highest priority ports remain powered. In accordance with the present invention, the global power management scheme also includes an analysis by the master CPU in the management blade on two particular ports from each blade. The first port is the lowest priority powered port (LPPP) on a blade and the second port is the highest priority non-powered port (HPNPP) on the blade. In one embodiment, the master CPU is responsible for ensuring that no HPNPPs have a higher priority than any LPPPs. This can happen, for example, where there is a change in configuration or a change in port priorities.

If the master CPU determines that an HPNPP has a higher priority than a LPPP, then the master CPU can address the situation by making an adjustment in the power that is allocated to the various blades. This adjustment can be implemented by the master CPU through an adjustment in the scaling factor that is applied to blades in the chassis. If a scaling factor for a blade is increased, then the amount of power available to the blade increases. Conversely, if a scaling factor for a blade is decreased, then the amount of power available to the blade decreases.

In operation, the adjustment of the scaling factor by the master CPU will have the intended effect of adjusting the particular ports in the blades that are powered. Specifically, the decrease in the power available to a blade would lead a local CPU, master PSE and slave PSE to adjust the ports in that blade such that the LPPP is disconnected. Similarly, the increase in the power available to a blade would lead a local CPU, master PSE and slave PSE to adjust the ports in the blade such that the HPNPP is connected. In general, if the power used is greater than the available power, then the port priority is evaluated and the lowest priority ports are turned off until the total power used is less than the power available.

Figure 5:
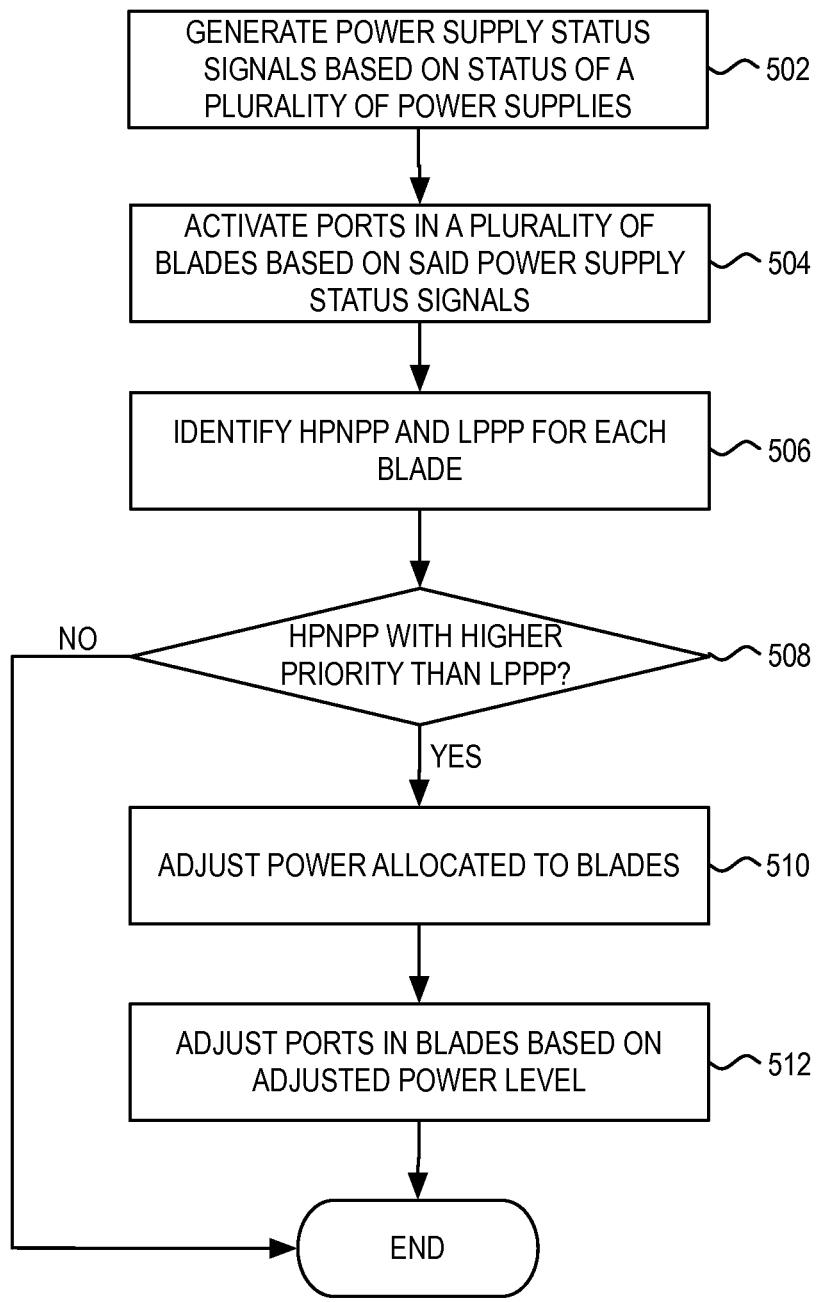
FIG. 5 illustrates a flowchart of a process of the present invention.

To further illustrate the principles of the present invention, reference is now made to the flowchart of FIG. 5. As illustrated, the process begins at step 502 where power supply status signals are generated based on a status of a plurality of power supplies. In one embodiment, the power supply status signals are generated using a logic block that receives a status input (e.g., power good signal) from each of the available power supplies. In combination, the power supply status signals are used to identify a particular level of power that is available to the chassis system.

At step 504, each of the blades in the chassis system can activate certain ports based on the available level of power reflected by the power supply status signals. In one embodiment, pre-configured registers that reflect the relative port priorities are used by each PSE controller to determine which ports should be powered. These pre-configured registers can implement a bit mask for each of the power supply status signal combinations.

Next, at step 506, the master CPU identifies the HPNPP and LPPP for each blade in the chassis system. At step 508, it is then determined whether there is an HPNPP with a higher priority than a LPPP. As noted, this can happen where there is a change in configuration or a change in port priorities. If it is determined at step 508 that there is no HPNPP with a higher priority than a LPPP, then no adjustments are needed. If, on the other hand, it is determined at step 508 that there is an HPNPP with a higher priority than a LPPP, then an adjustment is needed in the chassis system.

As illustrated, this adjustment is effected at step 510 where the master CPU adjusts the power level that is allocated to the various blades. In one embodiment, this adjustment in power level can be effected through the use of scaling factors. In the example of Table 3 above, the scaling factors are used to adjust the amount of power that is made available to each blade. If no scaling factor is used, then each blade would receive the same amount of power. Alternatively, a first scaling factor greater than one can be used to increase the amount of power made available to a first blade, while a second scaling factor less than one can be used to decrease the amount of power made available to a second blade. As would be appreciated, the value of the first and second scaling factors can be chosen such that the total amount of power made available to all of the blades remains the same.

At step 512, the adjusted amount of power that is made available to various blades would cause the affected blades to make adjustment in the ports that are powered. In particular, a blade that receives a lower amount of power could deactivate a port, while a blade that receives a greater amount of power could activate a port. As these changes are effected through the application of scaling factors, the master CPU can effect sufficient control to remedy a situation where there is an HPNPP with a higher priority than a LPPP. The result of such an adjustment is a consistency in powering in accordance with port priorities across multiple blades in the chassis system.

These and other aspects of the present invention will become apparent to those skilled in the art by a review of the preceding detailed description. Although a number of salient features of the present invention have been described above, the invention is capable of other embodiments and of being practiced and carried out in various ways that would be apparent to one of ordinary skill in the art after reading the disclosed invention, therefore the above description should not be considered to be exclusive of these other embodiments. Also, it is to be understood that the phraseology and terminology employed herein are for the purposes of description and should not be regarded as limiting.

What is claimed is:

1. A power over Ethernet management method in a chassis system having a plurality of blades that distribute power from a plurality of power supplies, comprising:
    generating power supply status signals that are reflective of a status of the plurality of power supplies;
    selecting, by each blade, a set of ports for activation, wherein said selection is based on a value of said power supply status signals;
    identifying, for a first of said plurality of blades, a highest priority non-powered port and a lowest priority powered port, said highest priority non-powered port representing a port in said first of said plurality of blades that has the highest priority among all non-powered ports in said first of said plurality of blades, said lowest priority powered port representing a port in said first of said plurality of blades that has the lowest priority among all powered ports in said first of said plurality of blades;
    identifying, for at least a second of said plurality of blades, a highest priority non-powered port and a lowest priority power port;
    determining whether said highest priority non-powered port in said first of said plurality of blades has a higher priority than said lowest priority powered port in said second of said plurality of blades; and
    if said highest priority non-powered port in said first of said plurality of blades has a higher priority than said lowest priority powered port in said second of said plurality of blades, then adjusting said chassis system such that said highest priority non-powered port in said first of said plurality of blades is powered.

2. The method of claim 1, wherein said generating comprises generating by a logic block that receives status signals from the plurality of power supplies.

3. The method of claim 1, wherein said selecting is based on pre-configured registers.

4. The method of claim 1, wherein said adjusting further comprises deactivating said lowest priority powered port in said second of said plurality of blades.

5. The method of claim 1, wherein said adjusting further comprises adjusting a scaling factor that controls an amount of power made available to said first and second of said plurality of blades.

6. A power over Ethernet management method, comprising:
    analyzing a lowest priority powered port and a highest priority non-powered port in a first blade of a chassis and a lowest priority powered port and a highest priority non-powered port in a second blade of a chassis, wherein a highest priority non-powered port represents a port in a blade that has the highest priority among all non-powered ports in that blade, and a lowest priority powered port represents a port in a blade that has the lowest priority among all powered ports in that blade; and
    adjusting an amount of power available to said first and second blade based on said analysis.

7. The method of claim 6, wherein said adjusting comprises adjusting a scaling factor that controls an amount of power delivered to said first blade and said second blade.

8. The method of claim 6, further comprising changing a status of a port in said first blade and said second blade based on said adjusting.

9. A power over Ethernet management system, comprising:
    a controller that analyzes a lowest priority powered port and a highest priority non-powered port in a first blade of a chassis and a lowest priority powered port and a highest priority non-powered port in a second blade of said chassis, wherein a highest priority non-powered port represents a port in a blade that has the highest priority among all non-powered ports in that blade, and a lowest priority powered port represents a port in a blade that has the lowest priority among all powered ports in that blade, and adjusts an amount of power available to said first and second blade based on said analysis.

10. The system of claim 9, wherein said controller adjusts a scaling factor that controls an amount of power delivered to said first blade and said second blade.

11. The system of claim 9, wherein said controller changes a status of a port in said first blade and said second blade based on said adjusting.

12. The system of claim 9, wherein said controller is not in either said first blade or said second blade.

13. The system of claim 9, wherein said controller is in a management blade in said chassis.

14. The system of claim 9, wherein said first blade includes a second controller that receives power supply status signals that are reflective of a status of a plurality of power supplies.

15. The system of claim 14, wherein said second controller selects a set of ports on said first blade for activation based on said power supply status signals.

16. The system of claim 14, wherein said power supply status signals are generated by a logic block that receives status signals from said plurality of power supplies.

17. The system of claim 14, wherein said second controller selects said set of ports based on pre-configured registers.

* * * * *

UNITED STATES PATENT AND TRADEMARK OFFICE
CERTIFICATE OF CORRECTION

PATENT NO. : 8,595,516 B2
APPLICATION NO. : 12/348269
DATED : November 26, 2013
INVENTOR(S) : Panguluri et al.

Page 1 of 1

It is certified that error appears in the above-identified patent and that said Letters Patent is hereby corrected as shown below:

In the Claims:

Col. 7, line 38, replace "power" with --powered--.

Col. 8, line 10, replace "a chassis" with --said chassis--.

Signed and Sealed this
Twenty-eighth Day of January, 2014

Michelle K. Lee
*Deputy Director of the United States Patent and Trademark Office*